United States Patent
Metz et al.

(10) Patent No.: US 9,498,760 B2
(45) Date of Patent: Nov. 22, 2016

(54) STABLE NANOPARTICULATE SUSPENSION AND METHOD FOR PRODUCTION

(71) Applicants: Ina Metz, Erkrath (DE); Christian Scheidt, Munster (DE); Stephan-Peter Bloess, Burscheid (DE)

(72) Inventors: Ina Metz, Erkrath (DE); Christian Scheidt, Munster (DE); Stephan-Peter Bloess, Burscheid (DE)

(73) Assignee: Kronos International, Inc., Leverkusen (DE)

( * ) Notice: Subject to any disclaimer, the term of this patent is extended or adjusted under 35 U.S.C. 154(b) by 430 days.

(21) Appl. No.: 13/626,991

(22) Filed: Sep. 26, 2012

(65) Prior Publication Data

US 2013/0074731 A1 Mar. 28, 2013

Related U.S. Application Data

(60) Provisional application No. 61/545,381, filed on Oct. 10, 2011.

(30) Foreign Application Priority Data

Sep. 27, 2011 (DE) ........................ 10 2011 114 363

(51) Int. Cl.
| | |
|---|---|
| *B82Y 30/00* | (2011.01) |
| *C09D 7/12* | (2006.01) |
| *B01F 17/00* | (2006.01) |
| *C03C 17/00* | (2006.01) |

(52) U.S. Cl.
CPC ....... *B01F 17/0007* (2013.01); *B01F 17/0028* (2013.01); *B01F 17/0042* (2013.01); *C03C 17/007* (2013.01); *C03C 2217/212* (2013.01); *C03C 2217/42* (2013.01); *C03C 2218/11* (2013.01)

(58) Field of Classification Search
None
See application file for complete search history.

(56) References Cited

U.S. PATENT DOCUMENTS

| | | | |
|---|---|---|---|
| 2005/0244319 A1* | 11/2005 | Hurley | ........................... 423/212 |
| 2008/0098932 A1* | 5/2008 | Perlet et al. | ............. 106/287.19 |

(Continued)

FOREIGN PATENT DOCUMENTS

| | | |
|---|---|---|
| CN | 101611331 A | 12/2009 |
| CN | 101981171 A | 2/2011 |
| CN | 102002260 A | 4/2011 |

(Continued)

OTHER PUBLICATIONS

SOLPLUS® D541, Lubrizol technical data sheet, Lubrizol, Ltd., United Kingdom, Mar. 2007.

(Continued)

*Primary Examiner* — Colin W Slifka
(74) *Attorney, Agent, or Firm* — Locke Lord, LLP

(57) ABSTRACT

The invention relates to a stable, highly concentrated, aqueous suspension of nanoparticles, particularly of titanium dioxide particles, a method for production, and use of the suspension, e.g. for coating or impregnation, or as an additive in organic or inorganic matrices. The suspension contains a first dispersant based on a polymeric alkoxylate and a second dispersant selected from the group of amino alcohols. The suspension is preferably characterized by the fact that its stability is preserved even during and after vigorous dispersion in an attrition mill and no increase in viscosity occurs. In a preferred embodiment, the viscosity declines by up to 10 to 50% as a function of the milling time. In a further embodiment, the suspension can be dried and subsequently redispersed, without the state of dispersion deteriorating.

33 Claims, 4 Drawing Sheets

(56) References Cited

U.S. PATENT DOCUMENTS

| | | |
|---|---|---|
| 2010/0110551 A1 | 5/2010 | Lamansky et al. |
| 2011/0046286 A1 | 2/2011 | Lubnin et al. |

FOREIGN PATENT DOCUMENTS

| | | |
|---|---|---|
| DE | 102004037118 A1 | 3/2006 |
| DE | 10 2006 057 903 | 12/2006 |
| EP | 1052225 | 11/2000 |
| WO | 90/13606 | 11/1990 |
| WO | 97/19948 | 6/1997 |
| WO | WO 2006/010438 | 2/2006 |
| WO | WO2010/110726 A1 | 9/2010 |

OTHER PUBLICATIONS

SOLPLUS® D540, Lubrizol technical data sheet, Lubrizol, Ltd., United Kingdom, Mar. 2007.

Elena Jubete, Christopher M. Liauw, Norman S. Allen, Water uptake and tensile properties of carboxylated styrene butadiene rubber based water born paints: Models for water uptake prediction; B.V. Elsevier, 2007, pp. 126-133, Manchester UK.

\* cited by examiner

STABLE NANOPARTICULATE SUSPENSION AND METHOD FOR PRODUCTION

CROSS REFERENCE TO RELATED APPLICATIONS

This application claims the benefit of German Patent Application Serial No. DE 102011114363.0 filed Sep. 27, 2011 and U.S. Provisional Patent Application Ser. No. 61/545,381 filed Oct. 10, 2011.

BACKGROUND

Field of the Invention

The invention relates to a stable, highly concentrated, aqueous suspension of nanoparticles, particularly of titanium dioxide particles, a method for production, and use of the suspension, e.g. for coating or impregnation, or as an additive in organic or inorganic matrices.

Description of Related Art

As nanoadditives, nanoparticles (particle size typically <100 nm) possess great potential for innovation, e.g. in coatings, plastics, optical articles, electronics, ceramics, specialty chemicals, etc. The nanoparticles can have different functions in this context, e.g. as photocatalysts, UV absorbers, abrasion protection, fillers, or for surface functionalization.

Owing to the small particle size and the strong tendency to agglomerate, it is usually not possible to process and apply nanoparticles in dry, powder state. For this reason, water- or solvent-based dispersions (suspensions) of the nanoparticles are produced as an alternative, various technologies being used to disagglomerate and disperse the particles. It is, however, of decisive importance that a very good, stable state of dispersion is achieved in order to be able to exploit the advantage of nanoadditives over the familiar microparticulate additives in use. If the nanoparticulate suspension is applied to a substrate as a coating, for example, the transparency of the suspension plays an important role.

Numerous methods have already been developed for effective dispersion of nanoparticles in various dispersion media, such as mixing with a high shear rate, ultrasonic treatment or various grinding technologies. In addition, various dispersants and other additives are known that can advantageously be used in a nanoparticulate suspension.

DE 10 2004 037 118 A1, for example, discloses a method for manufacturing an aqueous suspension of nanoscale titanium dioxide particles with a concentration of at least 20% by weight, where an amino alcohol and a carboxylic acid are used as dispersants and grinding is performed in a high-energy mill following predispersion.

According to WO 2010/110726 A1, amines or glycols are used as dispersants, and the suspension is ground in a bead mill with grinding media of a specified size.

In the known methods, a marked increase in viscosity often occurs during or after dispersion with high shear rates, e.g. in an attrition mill, this making further processing more difficult.

BRIEF DESCRIPTION OF THE INVENTION

The objects of the invention are to provide a stable, aqueous suspension of nanoparticles, with solids concentrations of up to 50% by weight and more, that can be produced simply and at low cost and displays no significant increase in viscosity, even at high shear rates. Not all of the objects are necessarily met by every embodiment covered by the claims.

The objects are solved by an aqueous suspension of nanoscale inorganic particles, which comprises a first dispersant based on a polymeric alkoxylate and a second dispersant selected from the group of amino alcohols. The objects are further solved by a method for producing an aqueous suspension of nanoscale inorganic particles, characterized in that a first dispersant based on a polymeric alkoxylate and a second dispersant selected from the group of amino alcohols are added. Further advantageous embodiments of the invention are described in the dependent claims.

BRIEF DESCRIPTION OF THE FIGURES

The invention is further described and explained in relation to the following figures wherein.

DESCRIPTION OF THE PREFERRED EMBODIMENTS

Figure 1:
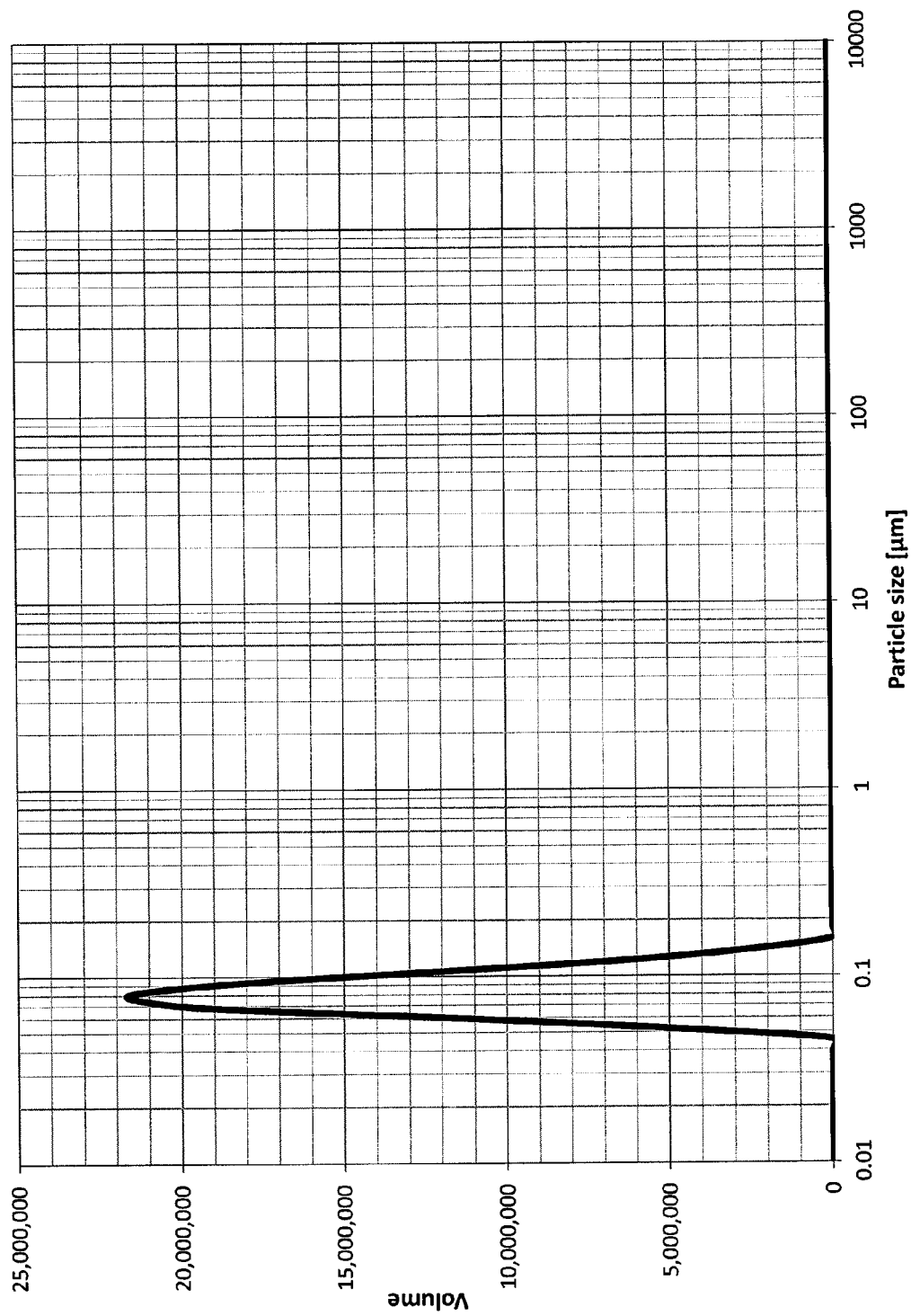
FIG. 1 is a graph of the particle size distribution of the dispersed suspensions, showing the volume on the ordinate axis and particle size measured in micrometers on the abscissa axis.

All data disclosed below regarding pH value, temperature, concentration in % by weight or % by volume, etc. are to be interpreted as also including all values lying in the range of the respective measuring accuracy known to the person skilled in the art.

The term nanoparticulate suspension is used below to denote the dispersion of nanoparticles (according to ISO/TS 80004/1) in a liquid phase.

Suitable as nanoscale inorganic particles are, in principle, all kinds of natural or synthetic nanoscale inorganic particles, preferably metal oxides, sulphides, sulphates, phosphates, silicates or aluminates. Particularly preferred are nanoscale metal oxides, especially photo-semiconductors. Nanoscale titanium dioxide particles are used in a special embodiment of the invention.

The suspension according to a preferred embodiment of the invention is characterized by the fact that the stability of the suspension is preserved even during and after vigorous dispersion, e.g. in an attrition mill. Preferably, no increase in viscosity occurs upon exposure to high shear forces. More preferably, a significant decline in viscosity of as much as 10 to 50% occurs as a function of the milling time.

In the preferred embodiment, a first dispersant based on a polymeric alkoxylate is used. The term alkoxylates means the salts of an alkanic (poly)alcohol. They are present in the form $(RO)_n Me$ (n=valence of the metal Me) and, depending on the pH value, are at least partially converted into the corresponding alcohols and metal ions in aqueous media.

Frequently used metals are the alkaline and alkaline-earth metals Na, K, Mg, Ca. Preferably polymeric alkoxylates functionalized with phosphate are used. Particularly suitable is use of the SOLPLUS D540 or D541 dispersant manufactured by Lubrizol.

Furthermore, a second dispersant selected from the group of amino alcohols is added. Suitable amino alcohols are e.g. 2-amino-2-methyl-1-propanol (AMP) or 2-amino-2-ethyl-1, 3-propane-diol (AEP).

The total quantity of added dispersants is in the range from roughly 3 to 40% by weight, referred to the nanoparticles, preferably 10 to 30% by weight and particularly 15 to 25% by weight.

In a preferred embodiment of the invention the first and the second dispersant are matched in order to achieve an optimized viscosity of the suspension. For example, optimized results are achieved by the combination SOLPLUS D540 (first dispersant) and AMP (second dispersant) or by the combination SOLPLUS D541 (first dispersant) and AEP (second dispersant). Without being bound by theory it is assumed that optimized results are achieved when no cross-linking occurs between the dispersants.

The content of nanoscale particles in the suspension according to the invention is preferably up to 70% by weight, more preferably 30 to 60% by weight, and even more preferably 40 to 50% by weight, referred to the suspension.

In addition to the dispersant according to the invention, further customary additives can optionally be used, such as solvents, defoamers, rheological additives, in-can preservatives (biocides), etc.

The suspension according to the invention is preferably produced in two steps, with predispersion first being performed with a dissolver and subsequent dispersion in an attrition mill. For example, water, the dispersant according to the invention and, optionally, the further additives are placed in the vessel and the nanoscale particles added while stirring with the dissolver.

The stirring time is dependent on the solids concentration and tendency to agglomerate of the nanoparticles and is preferably 30 to 60 minutes. The predispersion should display a pumpable consistency with a maximum viscosity of 2,000 mPa, preferably <1,200 mPa and particularly <1,000 mPa.

The pH value is subsequently set, preferably to a pH value of >4, depending on the application system. For example, if the suspension according to the invention is later to be used in paint and coating systems, a pH value of roughly 6 to 8 is set, whereas a pH value of roughly 7 to 10 is set for use in cement systems.

This is followed by dispersion in an attrition mill. The grinding beads preferably have a density of >3 g/cm$^3$. SAZ beads or Y-doped zircon beads are suitable, for example. The size of the grinding beads is preferably in the range from 0.1 to 1 mm, particularly preferably in the range from 0.1 to 0.6 mm and particularly in the range from 0.1 to 0.4 mm. According to a particularly preferred embodiment of the invention grinding beads with a size in the range of 0.1 to 0.2 mm are used.

In a preferred embodiment of the invention, the suspension displays a mean particle size (d50) of roughly <150 nm at the end of dispersion, preferably roughly <120 nm and more preferably roughly <100 nm.

The suspension of the preferred embodiment is stable and does not settle, even over a period of up to 3 months, i.e. there is no phase separation and no sedimentation.

In a preferred embodiment of the invention, the suspension according to the invention is stable at pH values of at least 5, preferably in a pH range of 5 to 8 and particularly preferably in a pH range of 7 to 8.

In addition, the suspension of the preferred embodiment displays high transparency that can be increased by extending the dispersion time.

In a further embodiment of the invention, the water can be removed from the suspension in a further step, e.g. by thermal treatment at roughly 50 to 120° C. The drying can be performed by known methods e.g. in a spray dryer or a fluidized bed. Furthermore, the suspension can be dried on a belt dryer or a plate dryer. In an alternative embodiment of the invention the suspension can be dried in a vacuum dryer.

This yields a kind of granulated material with a moisture content of preferably about <5% by weight, particularly about <1% by weight. The granules can later be redispersed in a corresponding amount of water or a polar solvent. During redispersion a suspension is produced after a short stirring time of less than about 5 minutes with a state of dispersion comparable to the original suspension.

Thus, the dried suspension can be used like a stir-in pigment.

The suspension according to the invention is suitable for use for coating or impregnating inorganic or organic surfaces, such as glass, ceramics, metal, wood, etc. The suspension according to the invention can furthermore be used as an additive in organic or inorganic matrices, such as paint and plastic systems or, for example, in cement systems, such as plasters or face concrete.

EXAMPLES

The invention is described below by means of two examples, although this is not to be interpreted as a limitation of the invention. Two suspensions having the following composition were produced:

Example 1

| | | |
|---|---|---|
| 1. | Demineralized water | 318.0 g |
| 2. | Rheolate 420 (rheological additive) | 3.5 g |
| 3. | Byk 023 (defoamer) | 2.0 g |
| 4. | SOLPLUS D540 (first dispersant) | 120.0 g |
| 5. | Acticide IMS (biocide) | 1.0 g |
| 6. | AMP 90 (second dispersant) | 55.5 g |
| 7. | Nanoscale titanium dioxide KRONOClean 7000 | 500.0 g |
| Total | | 1000.0 g |

Example 2

| | | |
|---|---|---|
| 1. | Demineralized water | 402.2 g |
| 2. | Laponite SL 25 (rheological additive) | 12.0 g |
| 3. | Byk 023 (defoamer) | 2.0 g |
| 4. | SOLPLUS D541 (first dispersant) | 124.0 g |
| 5. | Acticide IMS (biocide) | 1.0 g |
| 6. | AEPD VOX 1000 (second dispersant) | 58.8 g |
| 7. | Nanoscale titanium dioxide KRONOClean 7000 | 400.0 g |
| Total | | 1000.0 g |

The commercially available, nanoscale titanium dioxide product KRONOClean 7000 is in powder form and displays a mean particle size (d50) of roughly 1.7 µm (measured on the Mastersizer 2000 from Malvern, volume-based particle size distribution) and a specific surface area according to BET of roughly 240 m$^2$/g.

Components 1 to 6 were placed into the stirrer vessel, the titanium dioxide powder being added while stirring. Predispersion with the dissolver was performed for 30 minutes. When the resulting pH value was below 8, it was set to a pH value of 8 by further addition of the second dispersant. Finally, the suspension was dispersed in an attrition mill under the following conditions:

The mill volume was 125 ml, the volume of the grinding beads (ZrO$_2$ beads, 0.4 to 0.6 mm) being 100 ml, including the air-void volume. One liter of suspension was dispersed for 10 hours at 3,000 to 5,000 rpm and with an energy input of 700 W, the temperature being maintained below 50° C.

The particle size distribution of the dispersed suspensions (examples 1 and 2) was measured with the Mastersizer 2000 from Malvern. The resulting curves are identical for both examples (FIG. 1). The mean particle size (d50), calculated from the volume-based particle size distribution, was determined as being roughly 86 nm for both suspensions (see FIG. 1).

Figure 2:
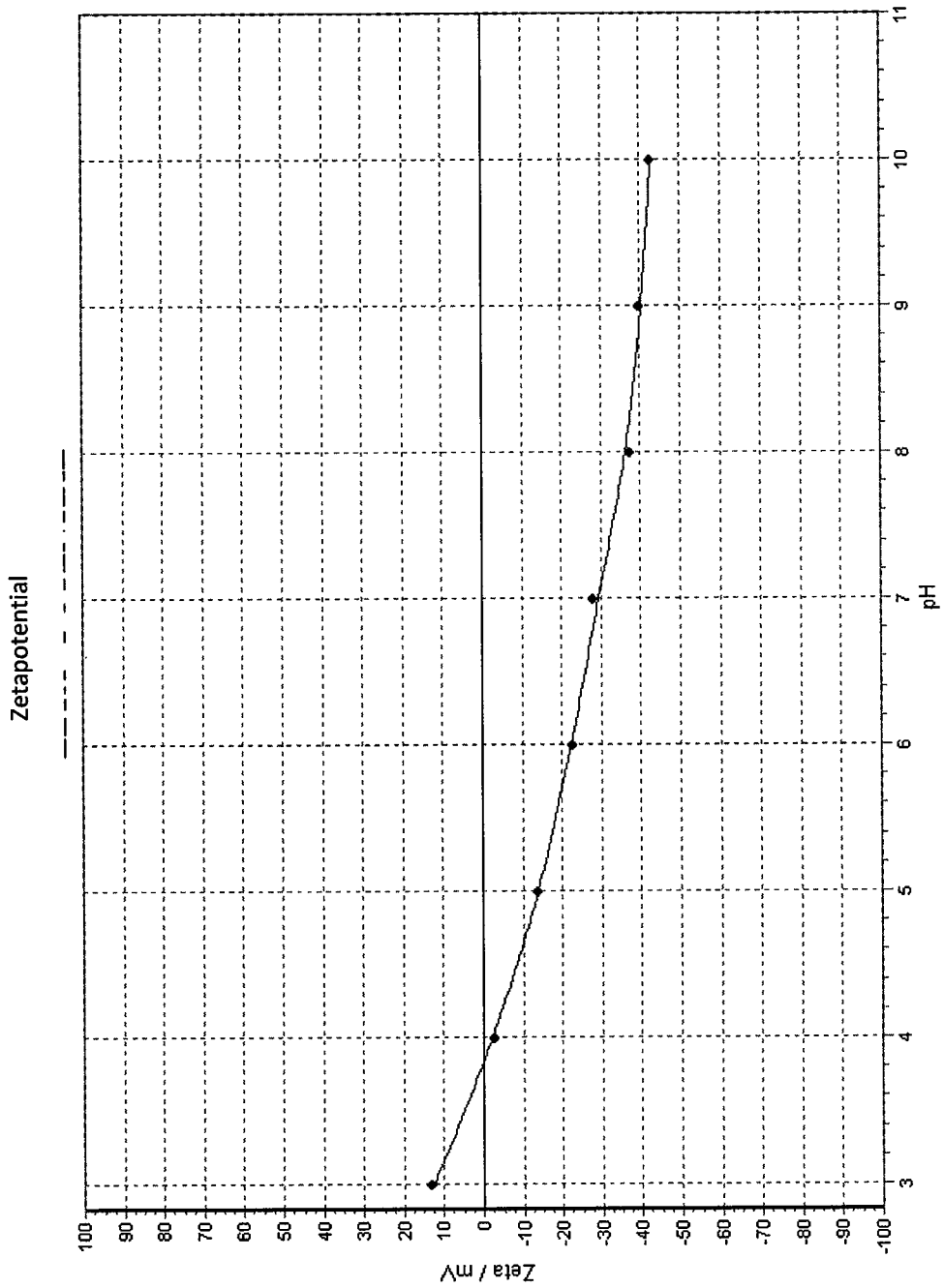
FIG. 2 is a graph of the zeta potential of the dispersed suspensions, showing the zeta measured in mV on the ordinate axis and pH on the abscissa axis.

FIG. 2 shows the zeta potential of the dispersed suspensions (examples 1 and 2) in the pH value range from 3 to 10. The curves are identical for both examples (FIG. 2). It can be seen that the isoelectric point of both suspensions is located at a pH value of roughly 3.8, and that the suspensions display sufficient electrical stabilization in the pH value range >5.

The transparency of the suspension was measured on a drawdown on glass consisting of 1 part suspension and 4 parts binder (Bayhydrol A145), where the suspension contained roughly 10% by weight titanium dioxide KRONOClean 7000 (otherwise the same formulation as above). The wet film thickness was roughly 90 µm. The drawdown on glass was dried at roughly 30° C., and the transparency measured with the Haze-Gard plus from Byk Gardner.

Figure 3:
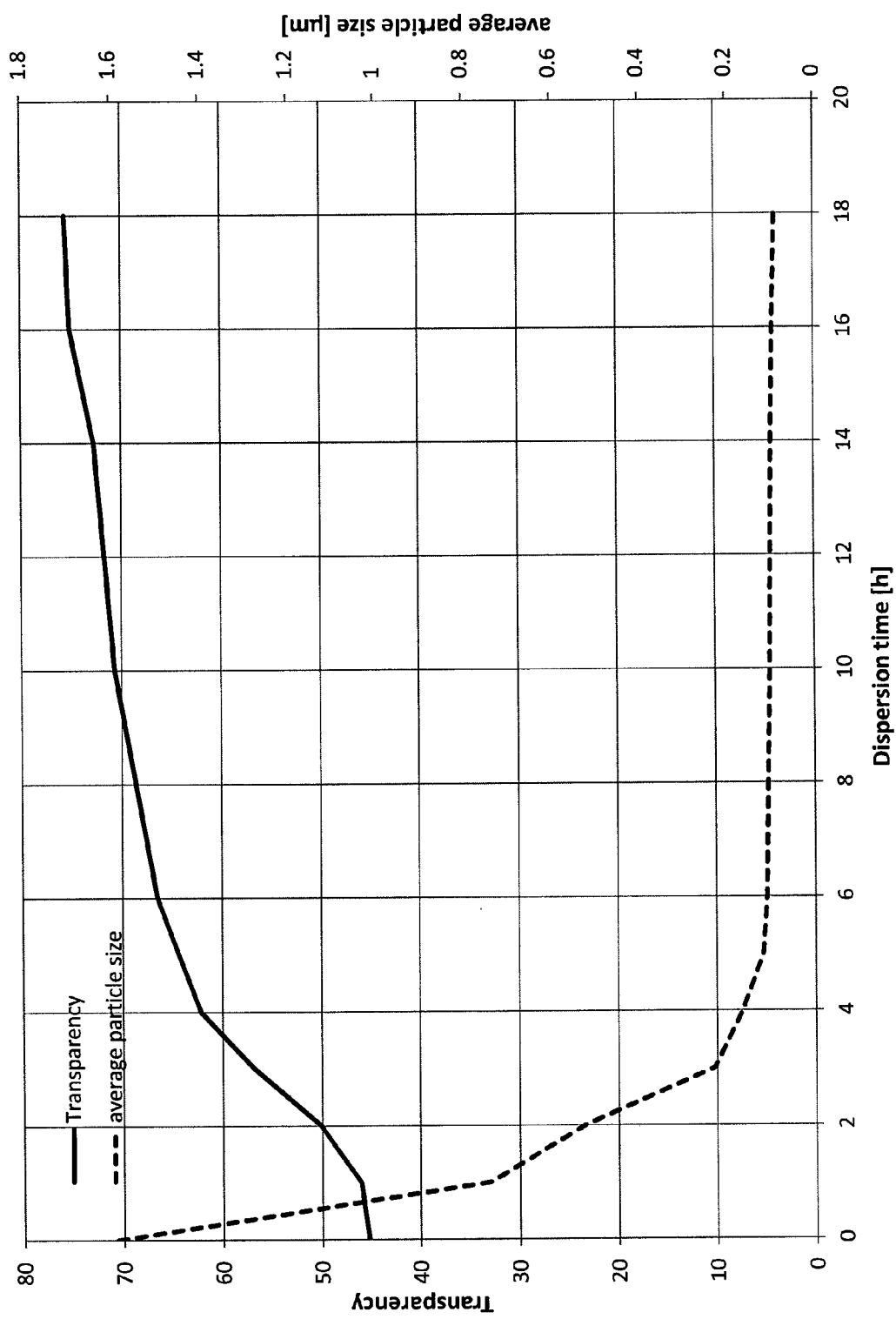
FIG. 3 is a graph showing the transparency based on the dispersion time of the dispersed suspensions, showing transparency on the left ordinate axis, average particle size in micrometers on the right ordinate axis and dispersion time in hours on the abscissa axis.

FIG. 3 shows the increase in transparency with increasing dispersing time for example 1.

Figure 4:
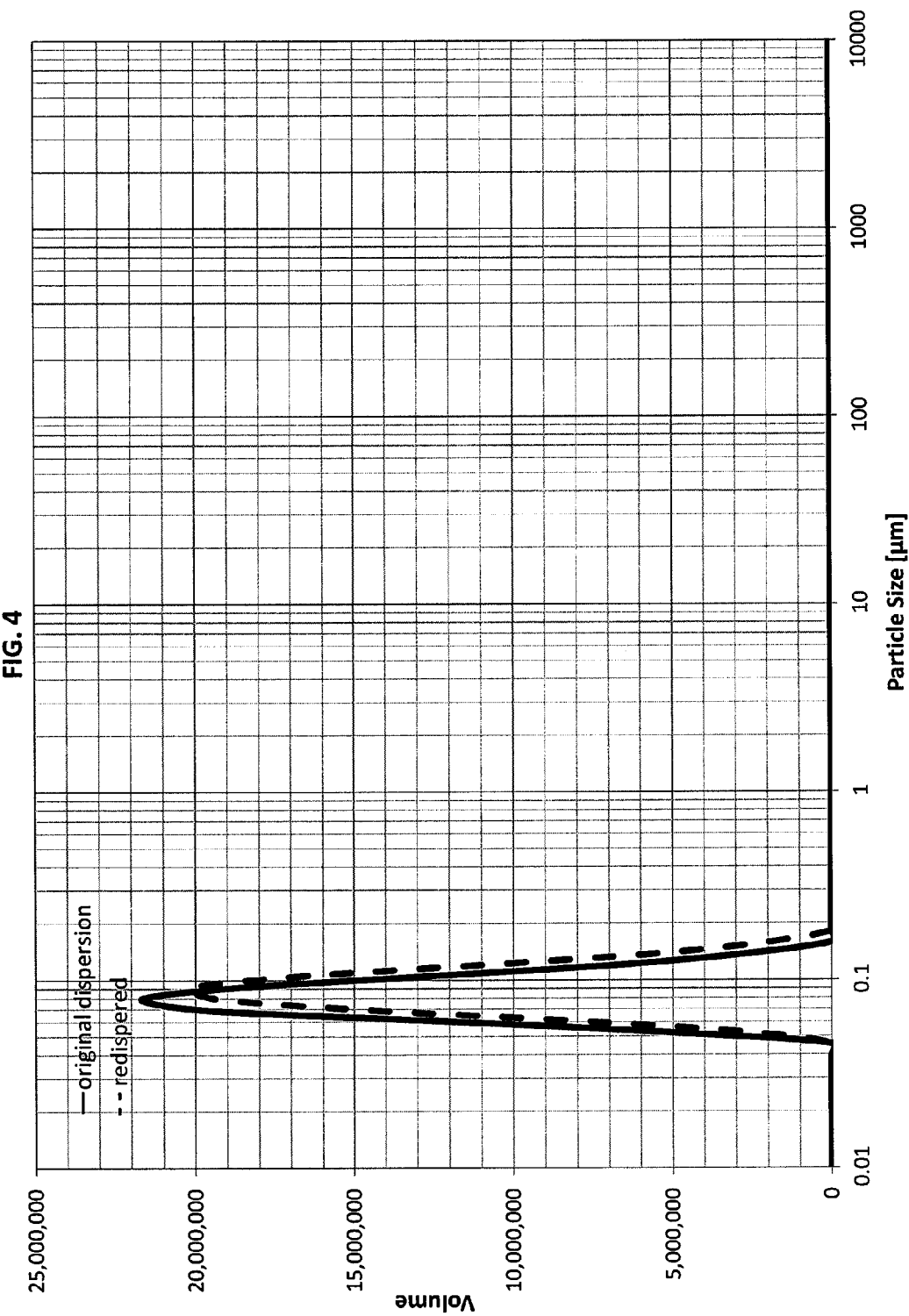
FIG. 4 is a graph of the particle size distributions of the original and redispersed suspensions, showing the volume on the ordinate axis and the particle size in micrometers on the abscissa axis.

The dispersed suspensions (examples 1 and 2) were subsequently dried for roughly 3 hours at 50 to 70° C., to a moisture content of roughly <1% by weight. The resultant, granular material was stirred with a paddle stirrer in a stirrer vessel for roughly 5 minutes with approx. 38% by weight water, referred to the total solids, and the particle size distribution of the redispersed suspensions was measured with the Mastersizer 2000. The resulting curves are identical for both examples. The mean particle size (d50), calculated from the volume-based particle size distribution, was roughly 94 nm for both redispersed suspensions. FIG. 4 shows the particle size distributions of the original suspension and the redispersed suspension for examples 1 and 2.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is being claimed is:

1. An aqueous suspension of nanoscale titanium dioxide particles comprising:
    nanoscale titanium dioxide particles, wherein the titanium dioxide particles are from about 30 to about 60 weight percent of the suspension;
    a first dispersant based on a polymeric alkoxylate functionalized with phosphate; and
    a second dispersant selected from the group of amino alcohols;
    wherein the total amount of dispersants are from about 3 to about 40 weight percent of the suspension;
    wherein the pH of the suspension is from 4 to about 10.

2. The aqueous suspension of claim 1, wherein the concentration of titanium dioxide particles is from about 40% to about 50% by weight.

3. The aqueous suspension of claim 1, wherein:
    the nanoscale particles are present in the suspension at a concentration of from about 40% to about 50% by weight.

4. The aqueous suspension of claim 3, wherein the suspension has a mean particle size of roughly less than 120 nm.

5. The aqueous suspension of claim 4, wherein the mean particle size is roughly less than 100 nm.

6. The aqueous suspension of claim 1, wherein:
    the suspension has a mean particle size of roughly less than 120 nm.

7. The aqueous suspension of claim 6, wherein the mean particle size is roughly less than 100 nm.

8. The aqueous suspension of claim 6, wherein the nanoscale inorganic particles are capable of remaining in suspension for three months.

9. The aqueous suspension of claim 6, wherein the suspension is stable at pH values greater than 5.

10. A method for producing an aqueous suspension of nanoscale inorganic particles, comprising the steps of:
    providing nanoscale titanium dioxide particles, wherein the titanium dioxide particles are from about 30 to about 60 weight percent of the suspension;
    adding a first dispersant based on a polymeric alkoxylate functionalized with phosphate; and
    adding a second dispersant selected from the group of amino alcohols
    wherein the total amount of dispersants are from about 3 to about 40 weight percent of the suspension;
    wherein the pH of the suspension is from 4 to about 10.

11. The method of claim 10, wherein nanoscale particles and the first and second dispersants are predispersed in water in a dissolver and then further dispersed in an attrition mill.

12. The method of claim 11, wherein grinding beads having a diameter of about 0.4 to about 0.6 mm are used in the attrition mill.

13. The method of claim 10, wherein the concentration of titanium dioxide particles is from about 40% to about 50% by weight of the suspension.

14. The method of claim 10, further comprising the step of reducing the suspension to a water content of less than about 5% by weight.

15. The method of claim 14, wherein the water content is reduced to less than about 1% by weight.

16. The method of claim 14, further comprising the step of subsequently redispersing the suspension in water.

17. The method of claim 10, further comprising the step of using the suspension as a coating or impregnation for inorganic or organic surfaces.

18. The method of claim 10, further comprising the step of using the suspension as an additive in organic or inorganic matrices.

19. The method of claim 18, wherein the organic or inorganic matrices is selected from the group consisting of paint, plastic, and cement systems.

20. The method of claim 10, wherein:
    the nanoscale particles are from about 40% to about 50% by weight of the suspension.

21. The method of claim 20, further comprising the step of reducing the suspension to a water content of less than about 5% by weight.

22. A method for producing an aqueous suspension of nanoscale inorganic particles, comprising the steps of:
   combining in a dissolver:
      water;
      nanoscale inorganic titanium dioxide particles, wherein the titanium dioxide particles are from about 30 to about 60 weight percent of the suspension,
      a first dispersant based on a polymeric alkoxylate that is functionalized with phosphate; and
      a second dispersant selected from the group of amino alcohols;
   wherein the total quantity of the first and second dispersant is from about 3% to about 40% by weight of the nanoscale inorganic particles and the nanoscale particles are present in the suspension at a concentration of up to 70% by weight of the suspension and the pH of the suspension is from 4 to about 10;
   stirring the suspension in the dissolver for a period of time sufficient for the suspension to have a viscosity of less than about 2000 mPa;
   dispersing the suspension in an attrition mill for a second period of time.

23. The method of claim 22, wherein the nanoscale particles are added to the dissolver after the dispersants and water and while stirring the suspension.

24. The method of claim 22, wherein the period of time is sufficient for the viscosity of the suspension to be less than about 1,200 mPa.

25. The method of claim 22, wherein the period of time is sufficient for the viscosity of the suspension to be less than about 1,000 mPa.

26. The method of claim 22, wherein the period of time the suspension is stirred in the dissolver is from about 30 to about 60 minutes.

27. The method of claim 22, further comprising the step of reducing the suspension to a water content of less than about 5% by weight.

28. The method of claim 27, wherein the water content is reduced to less than about 1% by weight.

29. The method of claim 27, further comprising the step of subsequently redispersing the suspension in water.

30. The method of claim 22, wherein the attrition mill uses grinding beads having a diameter of about 0.1 to about 1.0 mm.

31. The method of claim 30, wherein the grinding beads have a diameter of about 0.4 to about 0.6 mm.

32. The method of claim 22, wherein nanoscale particles are present in the suspension at a concentration of from about 30% to about 60% by weight of the suspension.

33. The method of claim 32, wherein nanoscale particles are present in the suspension at a concentration of from about 40% to about 50% by weight of the suspension.

* * * * *